(12) United States Patent
Zelesky et al.

(10) Patent No.: US 9,856,793 B2
(45) Date of Patent: Jan. 2, 2018

(54) INTERCOOLED COOLING AIR WITH IMPROVED AIR FLOW

(71) Applicant: United Technologies Corporation, Hartford, CT (US)

(72) Inventors: Mark F. Zelesky, Bolton, CT (US); Gabriel L. Suciu, Glastonbury, CT (US); Brian D. Merry, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 392 days.

(21) Appl. No.: 14/745,564

(22) Filed: Jun. 22, 2015

(65) Prior Publication Data

US 2016/0237901 A1 Aug. 18, 2016

Related U.S. Application Data

(63) Continuation-in-part of application No. 14/695,578, filed on Apr. 24, 2015.
(Continued)

(51) Int. Cl.
*F02C 6/04* (2006.01)
*F02C 6/08* (2006.01)
(Continued)

(52) U.S. Cl.
CPC ............... *F02C 6/08* (2013.01); *F02C 7/143* (2013.01); *F02K 3/115* (2013.01); *F05D 2260/211* (2013.01); *Y02T 50/676* (2013.01)

(58) Field of Classification Search
CPC .. F02C 6/08; F02C 7/143; F02C 7/185; F02C 9/18; F05D 2240/40; F05D 2260/20; F05D 2260/211; Y02T 50/675
See application file for complete search history.

(56) References Cited

U.S. PATENT DOCUMENTS 4,991,394 A * 2/1991 Wright .................... F02C 7/185
60/226.1
5,724,806 A * 3/1998 Horner ...................... F02C 7/12
60/728

(Continued)

OTHER PUBLICATIONS

European Search Report for European Application No. 16175533.5 dated Nov. 15, 2016.

*Primary Examiner* — Jesse Bogue
(74) *Attorney, Agent, or Firm* — Carlson, Gaskey & Olds, PC (57) ABSTRACT

A gas turbine engine comprises a main compressor section having a high pressure compressor with a downstream discharge, and more upstream locations. A turbine section has a high pressure turbine. A tap taps air from at least one of the more upstream locations in the compressor section, passes the tapped air through a heat exchanger and then to a cooling compressor. The cooling compressor compresses air downstream of the heat exchanger, and delivers air into the high pressure turbine. The cooling compressor includes a downstream connection that delivers discharge pressure air to an upstream location in the high pressure turbine and a second tap from an intermediate pressure location within the cooling compressor. The second tap is connected to a downstream location within the high pressure turbine. An intercooling system for a gas turbine engine is also disclosed.

19 Claims, 5 Drawing Sheets

Related U.S. Application Data

(60) Provisional application No. 62/115,578, filed on Feb. 12, 2015.

(51) Int. Cl.
  *F02K 3/115* (2006.01)
  *F02C 7/143* (2006.01)

(56) References Cited

U.S. PATENT DOCUMENTS

| | | |
|---|---|---|
| 5,758,485 A | 6/1998 | Frutschi |
| 6,134,880 A | 10/2000 | Yoshinaka |
| 6,430,931 B1 | 8/2002 | Homer |
| 7,284,377 B2 | 10/2007 | Joshi et al. |
| 7,810,332 B2* | 10/2010 | Olmes ................... F02C 3/22 60/39.17 |
| 2009/0196736 A1 | 8/2009 | Sengar et al. |
| 2015/0377054 A1* | 12/2015 | Mizukami ............... F01D 11/24 60/786 |
| 2017/0152765 A1* | 6/2017 | Uechi .................... F01K 23/10 |

* cited by examiner

INTERCOOLED COOLING AIR WITH IMPROVED AIR FLOW

CROSS-REFERENCE TO RELATED APPLICATION

This application is a continuation-in-part of U.S. patent application Ser. No. 14/695,578 (filed on Apr. 24, 2015 and entitled "Intercooled Cooling Air") and claims priority to U.S. Provisional Patent Application No. 62/115,578, filed 12 Feb. 2015.

BACKGROUND

This application relates to improvements in providing cooling air from a compressor section to a turbine section in a gas turbine engine.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

It is known to provide cooling air from the compressor to the turbine section to lower the operating temperatures in the turbine section and improve overall engine operation. Typically, air from the high compressor discharge has been tapped, passed through a heat exchanger, which may sit in the bypass duct and then delivered into the turbine section. The air from the downstream most end of the compressor section is at elevated temperatures.

SUMMARY

In a featured embodiment, a gas turbine engine comprises a main compressor section having a high pressure compressor with a downstream discharge, and more upstream locations. A turbine section has a high pressure turbine. A tap taps air from at least one of the more upstream locations in the compressor section, passes the tapped air through a heat exchanger and then to a cooling compressor. The cooling compressor compresses air downstream of the heat exchanger, and delivers air into the high pressure turbine. The cooling compressor includes a downstream connection that delivers discharge pressure air to an upstream location in the high pressure turbine and a second tap from an intermediate pressure location within the cooling compressor. The second tap is connected to a downstream location within the high pressure turbine.

In another embodiment according to the previous embodiment, air is also tapped from the downstream discharge of the high pressure compressor and mixed with air in the downstream connection before the mixed air is delivered to the upstream location in the high pressure turbine.

In another embodiment according to any of the previous embodiments, the upstream location in the high pressure turbine is a first stage of the high pressure turbine.

In another embodiment according to any of the previous embodiments, a main fan delivers bypass air into a bypass duct and into a heat exchanger which is positioned within the bypass duct to be cooled by bypass air.

In another embodiment according to any of the previous embodiments, the cooling compressor includes a centrifugal compressor impeller.

In another embodiment according to any of the previous embodiments, air temperatures at the downstream most location of the high pressure compressor are greater than or equal to 1350° F.

In another embodiment according to any of the previous embodiments, the turbine section drives a bull gear, the gear further driving an impeller of the cooling compressor.

In another embodiment according to any of the previous embodiments, the bull gear also drives an accessory gearbox.

In another embodiment according to any of the previous embodiments, a gear ratio multiplier is included such that the impeller rotates at a faster speed than the tower shaft.

In another embodiment according to any of the previous embodiments, the impeller is a centrifugal compressor impeller.

In another embodiment according to any of the previous embodiments, an auxiliary fan is positioned upstream of the heat exchanger.

In another embodiment according to any of the previous embodiments, an auxiliary fan is positioned upstream of the heat exchanger.

In another embodiment according to any of the previous embodiments, the auxiliary fan operates at a variable speed.

In another embodiment according to any of the previous embodiments, air temperatures at the downstream most location of the high pressure compressor are greater than or equal to 1350° F.

In another featured embodiment, an intercooling system for a gas turbine engine comprises a heat exchanger for cooling air drawn from a portion of a main compressor section at a first temperature and pressure for cooling the air to a second temperature cooler than the first temperature. A cooling compressor compresses air communicated from the heat exchanger to a second pressure greater than the first pressure and communicates the compressed air to a portion of a turbine section. The cooling compressor includes a downstream connection that delivers discharge pressure air to an upstream location in the high pressure turbine. A second tap taps from an intermediate pressure location within the cooling compressor, and is connected to a downstream location within the high pressure turbine.

In another embodiment according to the previous embodiment, air is also tapped from the downstream discharge of the high pressure compressor and mixed with air in the downstream connection before the mixed air is delivered to the upstream location in the high pressure turbine.

In another embodiment according to any of the previous embodiments, an auxiliary fan is positioned upstream of the heat exchanger.

In another embodiment according to any of the previous embodiments, a bull gear drives an impeller of the cooling compressor.

In another embodiment according to any of the previous embodiments, the bull gear also drives an accessory gearbox.

In another featured embodiment, a gas turbine engine comprises a high pressure compressor with a downstream discharge and more upstream locations, a turbine section, and a tap that taps air from at least one of the more upstream locations in the compressor section, passing the tapped air through a heat exchanger and then to a cooling compressor. The cooling compressor compresses air downstream of the heat exchanger, and delivers air into the turbine.

These and other features may be best understood from the following drawings and specification.

DETAILED DESCRIPTION

Figure 1:
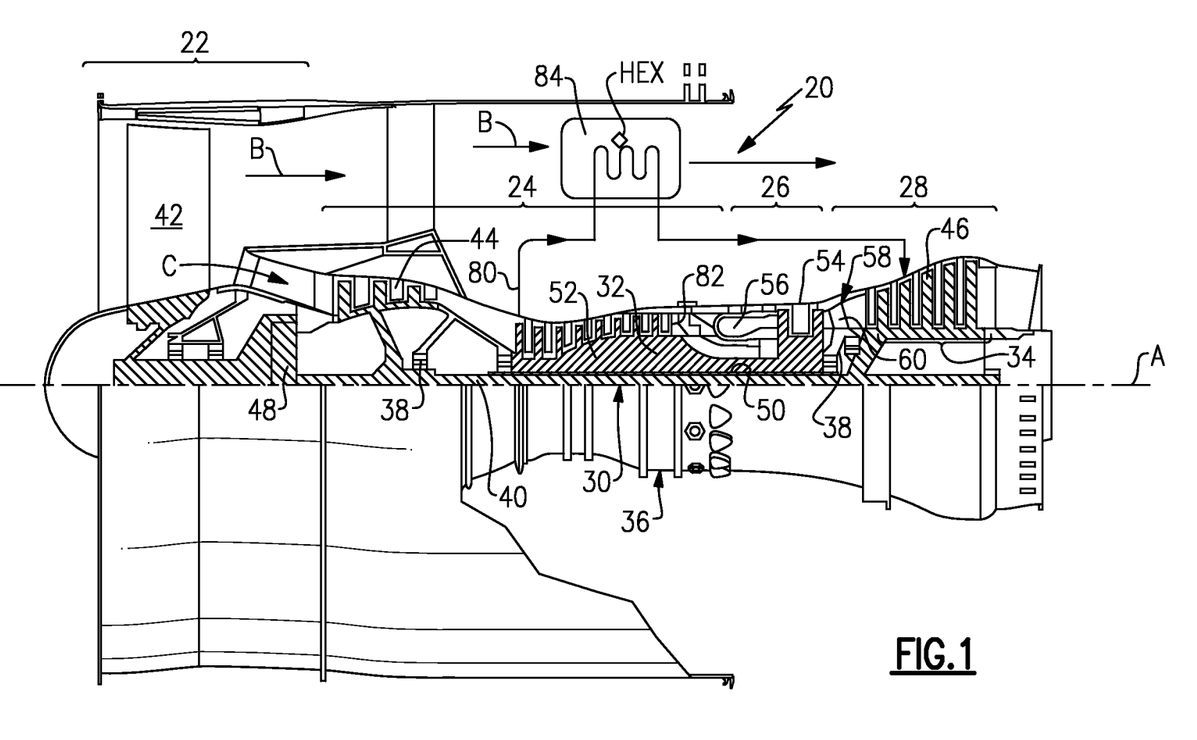
FIG. 1 schematically shows an embodiment of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure turbine require additional cooling air as the overall pressure ratio increases.

The example engine 20 utilizes air bleed 80 from an upstream portion of the compressor section 24 for use in cooling portions of the turbine section 28. The air bleed is from a location upstream of the discharge 82 of the compressor section 24. The bleed air passes through a heat exchanger 84 to further cool the cooling air provided to the turbine section 28. The air passing through heat exchanger 84 is cooled by the bypass air B. That is, heat exchanger 84 is positioned in the path of bypass air B.

Figure 2:
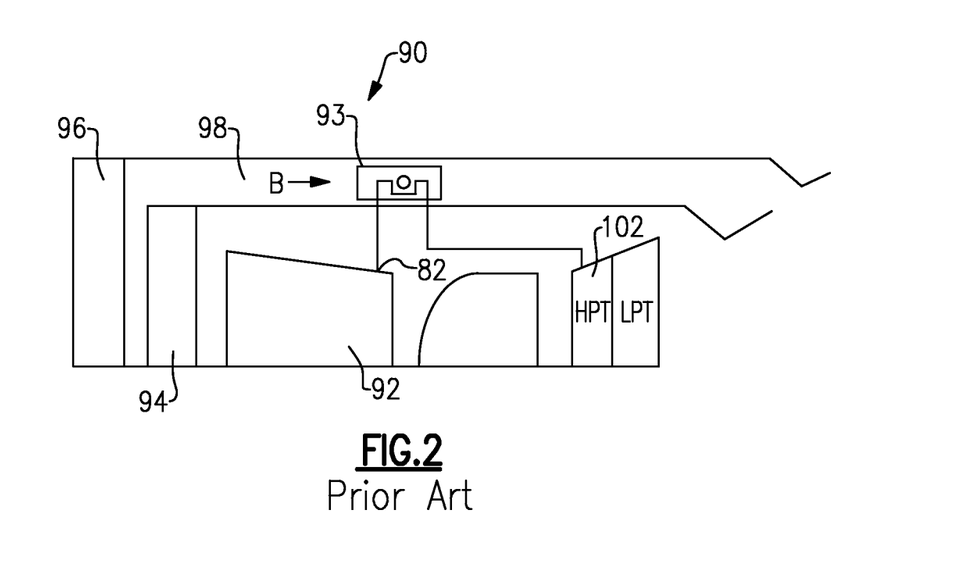
FIG. 2 shows a prior art engine.

A prior art approach to providing cooling air is illustrated in FIG. 2. An engine 90 incorporates a high pressure compressor 92 downstream of the low pressure compressor 94. As known, a fan 96 delivers air into a bypass duct 98 and into the low pressure compressor 94. A downstream most point, or discharge 82 of the high pressure compressor 92 provides bleed air into a heat exchanger 93. The heat exchanger is in the path of the bypass air in bypass duct 98, and is cooled. This high pressure high temperature air from location 82 is delivered into a high pressure turbine 102.

The downstream most point 82 of the high pressure compressor 82 is known as station 3. The temperature T3 and pressure P3 are both very high.

In future engines, T3 levels are expected to approach greater than or equal to 1350° F. Current heat exchanger technology is becoming a limiting factor as they are made of materials, manufacturing, and design capability which have difficulty receiving such high temperature and pressure levels.

Figure 3:
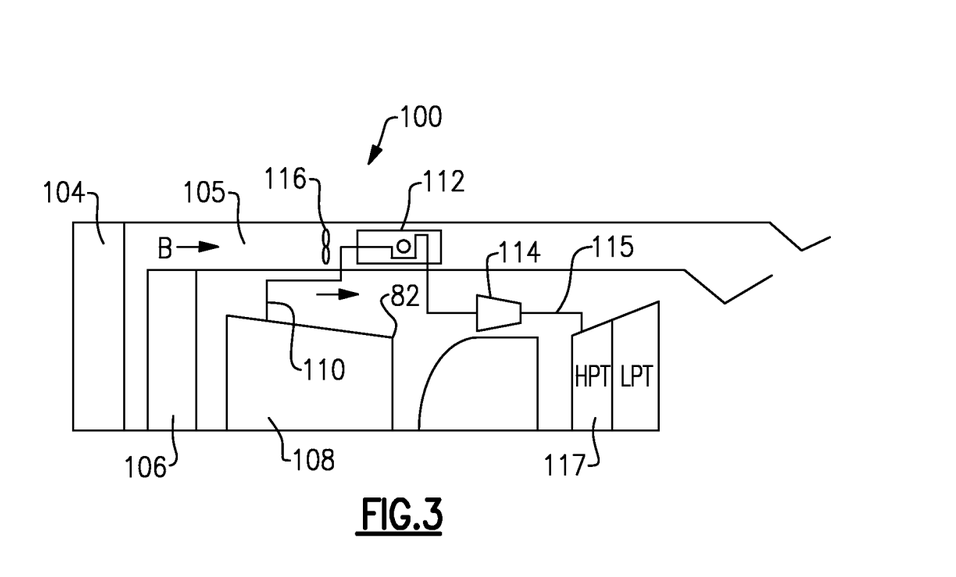
FIG. 3 shows one example engine.

FIG. 3 shows an engine 100 coming within the scope of this disclosure. A fan 104 may deliver air B into a bypass duct 105 and into a low pressure compressor 106. High pressure compressor 108 is positioned downstream of the low pressure compressor 106. A bleed 110 taps air from a location upstream of the downstream most end 82 of the high pressure compressor 108. This air is at temperatures and pressures which are much lower than T3/P3. The air tapped at 110 passes through a heat exchanger 112 which sits in the bypass duct 105 receiving air B. Further, the air from the heat exchanger 112 passes through a compressor 114, and then into a conduit 115 leading to a high turbine 117. This structure is all shown schematically.

Since the air tapped at point 110 is at much lower pressures and temperatures than the FIG. 2 prior art, currently available heat exchanger materials and technology may be utilized. This air is then compressed by compressor 114 to a higher pressure level such that it will be able to flow into the high pressure turbine 117.

An auxiliary fan 116 may be positioned upstream of the heat exchanger 112 as illustrated. The main fan 104 may not provide sufficient pressure to drive sufficient air across the heat exchanger 112. The auxiliary fan will ensure there is adequate air flow in the circumferential location of the heat exchanger 112.

In one embodiment, the auxiliary fan may be variable speed, with the speed of the fan varied to control the temperature of the air downstream of the heat exchanger 112. As an example, the speed of the auxiliary fan may be varied based upon the operating power of the overall engine.

Figure 4:
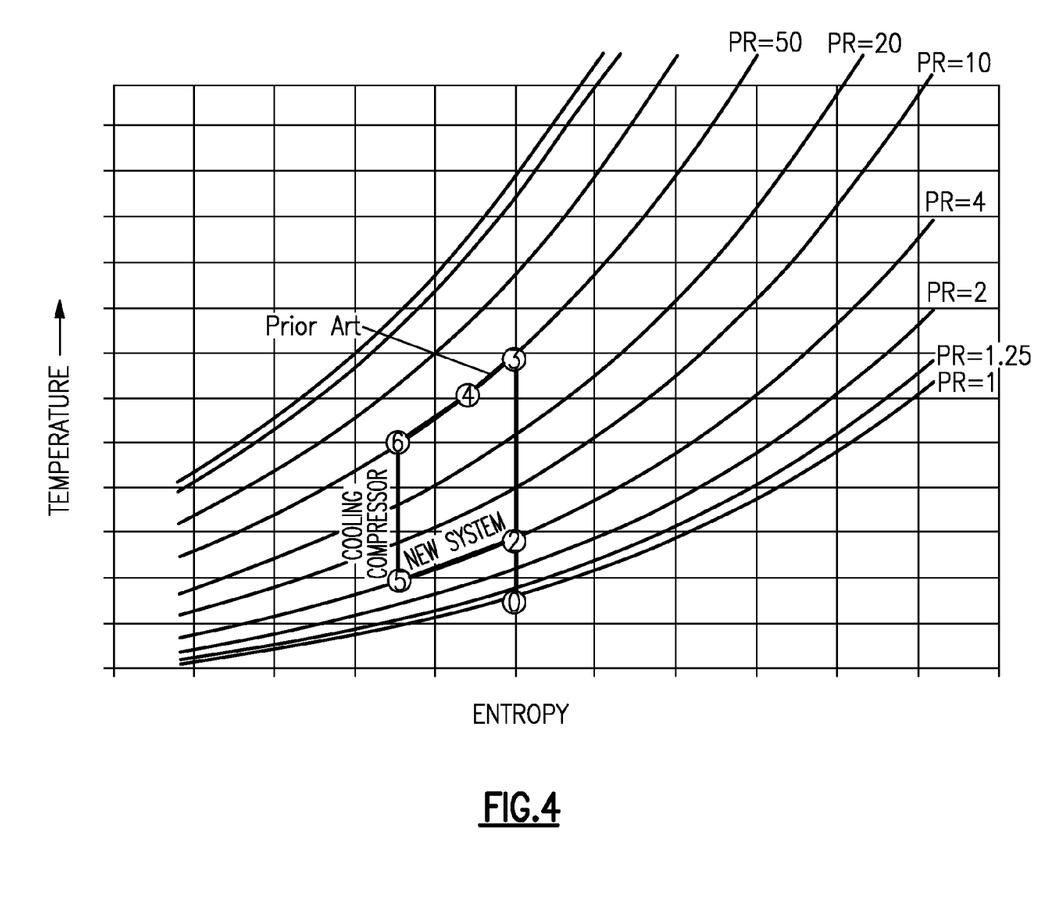
FIG. 4 is a graph illustrating increasing temperatures of a tapped air against the work required.

Referring to FIG. 4, a temperature/entropy diagram illustrates that a lower level of energy is spent to compress air of a lower temperature to the desired P3 pressure level. Cooler air requires less work to compress when compared to warmer air. Accordingly, the work required to raise the pressure of the air drawn from an early stage of the compressor section is less than if the air were compressed to the desired pressure within the compressor section. Therefore, high pressure air at P3 levels or higher can be obtained at significantly lower temperatures than T3. As shown in FIG. 4, to reach a particular pressure ratio, 50 for example, the prior system would move from point 2 to point 3, with a dramatic increase in temperature. However, the disclosed or new system moves from point 2 to point 5 through the heat exchanger, and the cooling compressor then compresses the air up to point 6. As can be appreciated, point 6 is at a much lower temperature.

Figure 5:
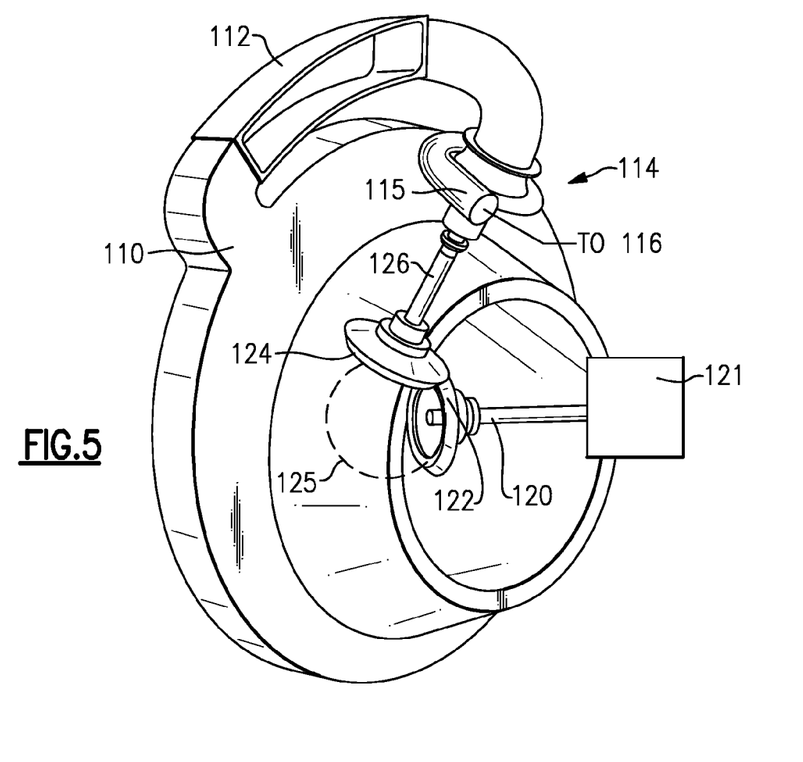
FIG. 5 shows a detail of an example of an engine.

FIG. 5 shows a detail of compressor 114 having an outlet into conduit 115. A primary tower shaft 120 drives an accessory gearbox 121. The shaft 126 drives a compressor rotor within the compressor 114. The shafts 120 and 126 may be driven by a bull gear 125 that is driven by a turbine rotor. In one example, it also rotates with a high pressure compressor rotor.

Figure 6:
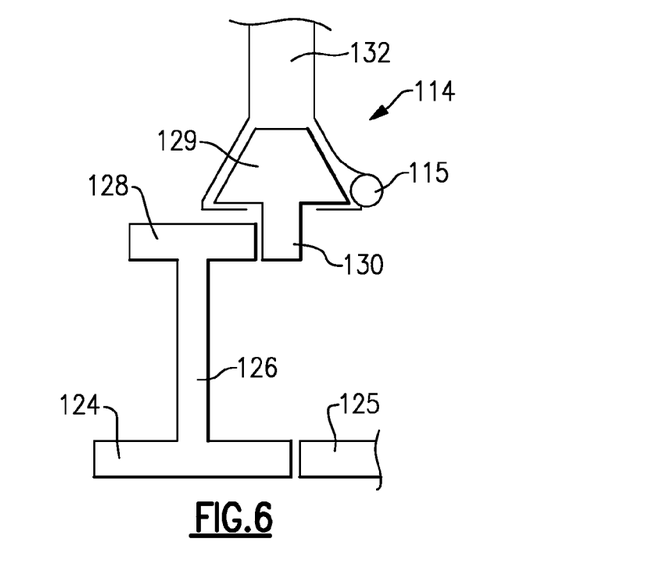
FIG. 6 shows a further detail of the example engine of FIG. 5.

FIG. 6 shows an example wherein a gear 128 is driven by the shaft 126 to, in turn, drive a gear 130 which drives a compressor impeller 129. An input 132 to the compressor impeller 129 supplies the air from the tap 110. The air is compressed and delivered into the outlet conduit 115.

By providing a gear ratio multiplier between the compressor impeller 129 and the high spool bull gear 125, the compressor impeller may be driven to operate an optimum speed. As an example, the gear ratio increase may be in a range of 5:1-8:1, and in one example, 6.1.

Details of the engine, as set forth above, may be found in co-pending U.S. patent application Ser. No. 14/695,578, which is incorporated herein by reference in its entirety.

The system as described above has many benefits. Once the air has passed through the compressor 114, it will have been compressed to a very high pressure. This pressure is beneficial for delivery to the first stage of a high pressure turbine. However, further downstream within the high pressure turbine, the higher pressure for the cooling air is not necessary. If air is delivered to those downstream stages, then there may be efficiency losses as it would not be necessary to compress that air to such a high degree.

Figure 7:
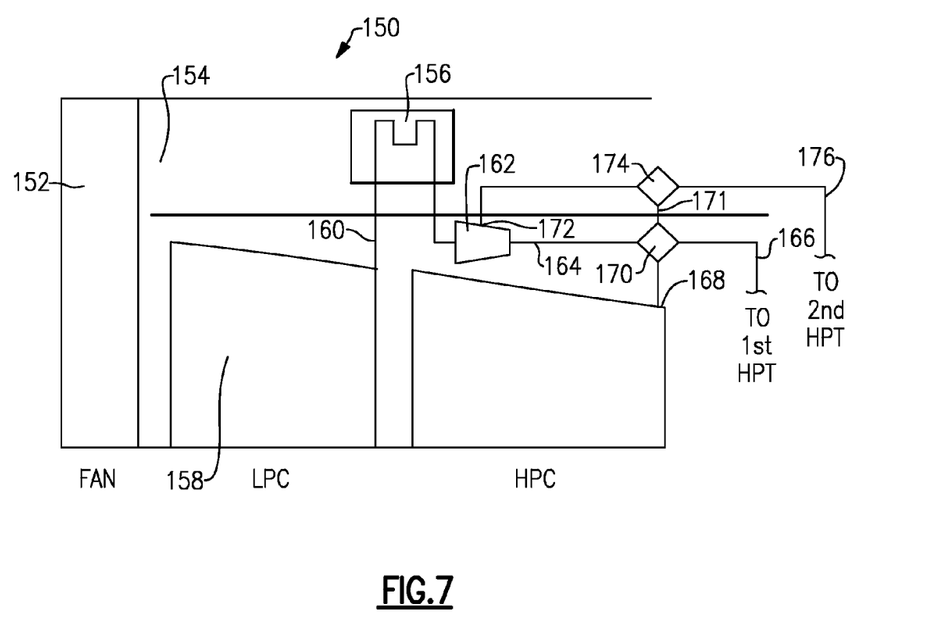
FIG. 7 shows a feature of the example engine of FIG. 5.

An engine embodiment 150 is shown in FIG. 7. A fan 152 delivers air into a bypass duct 154, and across the heat exchanger 156, as in the prior embodiments. Low pressure compressor 158 is associated with a tap 160 which passes through the heat exchanger 156. That air then passes to an auxiliary compressor 162 which has a discharge delivering the air to a discharge duct 164. Discharge duct 164 is delivered to an upstream location 166 within a high pressure turbine. This may be the first stage of the high pressure turbine.

An intermediate pressure tap 172 within the compressor 162 taps air through a mixer 174, and to a downstream cooling location 176. Downstream cooling location may be a second stage, or even further downstream in the high pressure turbine. The air at tap 172 has not been compressed to its full extent, and the losses mentioned above are not experienced.

In addition, it may be possible to tap air from a compressor discharge point 168 through a mixer 170, and mix that air with the air in the line 164. If the air in line 164 is cool enough, this may allow the mixing of some of the air from location 164 before the mixed air is delivered to line 166.

Similarly, the mixer 174 may receive air from line 171 to mix with the air tapped from the intermediate pressure tap 172.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising;
a main compressor section having a high pressure compressor with a downstream discharge, and more upstream locations;
a turbine section having a high pressure turbine;
a tap tapping air from at least one of said more upstream locations in said compressor section, passing said tapped air through a heat exchanger and then to a cooling compressor, said cooling compressor compressing air downstream of said heat exchanger, and delivering air into said high pressure turbine; and
said cooling compressor including a downstream connection for delivering discharge pressure air to an upstream location in said high pressure turbine and a second tap from an intermediate pressure location within said cooling compressor, and said second tap being connected to a downstream location within said high pressure turbine without further compression.

2. The gas turbine engine as set forth in claim 1, wherein air is also tapped from said downstream discharge of said high pressure compressor and mixed with air in said downstream connection before the mixed air is delivered to said upstream location in said high pressure turbine.

3. The gas turbine engine as set forth in claim 2, wherein said upstream location in said high pressure turbine is a first stage of said high pressure turbine.

4. The gas turbine engine as set forth in claim 2, wherein a main fan delivers bypass air into a bypass duct and into said heat exchanger positioned within said bypass duct to be cooled by bypass air.

5. The gas turbine engine as set forth in claim 2, wherein said cooling compressor includes a centrifugal compressor impeller.

6. The gas turbine engine as set forth in claim 2, wherein air temperatures at said downstream most location of said high pressure compressor are greater than or equal to 1350° F.

7. The gas turbine engine as set forth in claim 2, wherein said turbine section driving a bull gear, said bull gear further driving an impeller of said cooling compressor.

8. The gas turbine engine as set forth in claim 7, wherein said bull gear also driving an accessory gearbox.

9. The gas turbine engine as set forth in claim 8, wherein a gear ratio multiplier is included such that said impeller rotates at a faster speed than said tower shaft.

10. The gas turbine engine as set forth in claim 7, wherein said impeller is a centrifugal compressor impeller.

11. The gas turbine engine as set forth in claim 10, wherein an auxiliary fan is positioned upstream of the heat exchanger.

12. The gas turbine engine as set forth in claim 1, wherein an auxiliary fan is positioned upstream of the heat exchanger.

13. The gas turbine engine as set forth in claim 12, wherein said auxiliary fan operates at a variable speed.

14. The gas turbine engine as set forth in claim 1, wherein air temperatures at said downstream most location of said high pressure compressor are greater than or equal to 1350° F.

15. An intercooling system for a gas turbine engine comprising:
a heat exchanger for cooling air drawn from a portion of a main compressor section at a first temperature and pressure for cooling the air to a second temperature cooler than the first temperature;
a cooling compressor compressing air communicated from the heat exchanger to a second pressure greater than the first pressure and for communicating the compressed air to a portion of a turbine section; and
said cooling compressor including a downstream connection for delivering discharge pressure air to an upstream location in the high pressure turbine and a second tap tapped from an intermediate pressure location within said cooling compressor, and said second tap for being connected to a downstream location within the high pressure turbine without further compression.

16. The intercooling system as set forth in claim 15, wherein air is also tapped from said downstream discharge of said high pressure compressor and mixed with air in said downstream connection before the mixed air is delivered to said upstream location in said high pressure turbine.

17. The intercooling system as set forth in claim 15, wherein an auxiliary fan is positioned upstream of the heat exchanger.

18. The intercooling system as set forth in claim 15, wherein a bull gear drives an impeller of said cooling compressor.

19. The intercooling system as set forth in claim 18, wherein said bull gear also driving an accessory gearbox.

* * * * *